(12) United States Patent
Yonnet

(10) Patent No.: US 6,776,180 B1
(45) Date of Patent: Aug. 17, 2004

(54) WATER DISTRIBUTION PRESSURE CONTROL METHOD AND APPARATUS

(75) Inventor: Claude Yonnet, Matlock (GB)

(73) Assignee: Technolog Limited (GB)

( * ) Notice: Subject to any disclaimer, the term of this patent is extended or adjusted under 35 U.S.C. 154(b) by 83 days.

(21) Appl. No.: 10/088,274

(22) PCT Filed: Sep. 11, 2000

(86) PCT No.: PCT/GB00/03484

§ 371 (c)(1),
(2), (4) Date: Mar. 15, 2002

(87) PCT Pub. No.: WO01/22187

PCT Pub. Date: Mar. 29, 2001

(30) Foreign Application Priority Data

Sep. 17, 1999 (GB) .............................. 9922069

(51) Int. Cl.⁷ .............................. G05D 16/20
(52) U.S. Cl. .................. 137/14; 137/487.5; 251/29; 251/129.06
(58) Field of Search .................. 137/4, 487.5, 613; 251/26, 29, 129.06

(56) References Cited

U.S. PATENT DOCUMENTS

| | | |
|---|---|---|
| 4,084,539 A | 4/1978 | Schmidt |
| 4,200,911 A * | 4/1980 | Matsumoto ............... 700/28 |
| 4,625,139 A | 11/1986 | Frisch |
| 4,916,698 A | 4/1990 | McCann |
| 5,047,965 A * | 9/1991 | Zlokovitz ............... 700/282 |
| 5,097,858 A * | 3/1992 | Zlokovitz et al. ............ 137/14 |
| 5,318,271 A | 6/1994 | Frisch |
| 5,343,894 A | 9/1994 | Frisch et al. |
| 5,370,152 A * | 12/1994 | Carey et al. ............. 137/487.5 |
| 5,460,196 A * | 10/1995 | Yonnet ................... 137/12 |
| 5,730,417 A * | 3/1998 | Keville et al. ......... 251/129.06 |
| 5,967,167 A * | 10/1999 | Johnson ................... 137/14 |
| 6,223,774 B1 * | 5/2001 | Fournier et al. ......... 137/637.2 |

FOREIGN PATENT DOCUMENTS

| | | | |
|---|---|---|---|
| EP | 0 565 510 A2 | 3/1996 | ............ F15B/5/00 |
| FR | 1582851 | * 10/1969 | |
| FR | 2582827 | 3/1985 | .......... G05D/16/20 |

OTHER PUBLICATIONS

Japanese Abstract 05248556, Sep. 24, 1993, Fluid Pressure Control Valve, Nissan Motor Co. Ltd.

* cited by examiner

Primary Examiner—Ramesh Krishnamurthy
(74) Attorney, Agent, or Firm—Head, Johnson & Kachigian

(57) ABSTRACT

In one aspect, the prevent invention provides control apparatus for controlling the pressure of a water distribution system. Typically the apparatus will be connected to a main pressure reducing valve in the system, which main valve is under the control of a dual diaphragm pilot valve. The control apparatus includes variable gas pressure output pipes which, in one embodiment, are connected to the pilot valve. There is also provided a relatively high gas pressure source and a relatively low gas pressure source, each of which are selectively connectable to the variable gas pressure output means in order to vary the pressure of the variable gas pressure source.

24 Claims, 6 Drawing Sheets

WATER DISTRIBUTION PRESSURE CONTROL METHOD AND APPARATUS

CROSS-REFERENCE TO RELATED APPLICATION

This application claims priority to PCT/GB00/03484 filed Sep. 11, 2000, which claims priority to British Application No. 9922069.1 filed Sep. 17, 1999.

BACKGROUND OF THE INVENTION

This invention relates to a water distribution system pressure control method and apparatus.

One of the applicant's prior patents, European Patent No. 574241, the teaching of which is incorporated herein by reference, describes a low power control apparatus for controlling the pressure at the outlet of a valve in a water distribution system by applying a variable pressure signal to one chamber of a dual diaphragm pilot valve. The pilot valve in turn controls the main valve. The variable pressure signal is varied by the operation of a pair of low power solenoid valves, one of which is connected to a source of high pressure and the other of which is vented to atmospheric pressure.

The design concentrates in minimizing power consumption from its battery supply by keeping the pulsed operation of the solenoid valves to a minimum, and trapping a volume of water at a controlled pressure in the second chamber of a dual chamber pilot. The design is inherently low power for it has no requirement for operating solenoid valves when the required pressure is reached and demand (flow) conditions remain the same.

The solenoid valves used in this device are required to be small so that the energy required to operate is kept to a minimum. However, the smaller the solenoid valve, the smaller the orifice size, and the finer the filtration required to prevent solids from interfering with the solenoid valve operation. Using too fine filtering causes frequent blocking of filter and hence loss of operation in most water quality conditions encountered in potable water distribution systems. This compromise between orifice size, energy level and filtration requirement limits the reliability of the system.

Another aspect of the apparatus of EP574241 is to "trap" a volume of water at a given pressure (control pressure) within the control chamber of the valve pilot. Due to the incompressibility of the water and the fact that the pilot stem needs to be free to move to control its outlet pressure, the apparatus relies on the elasticity of the pipe work and the flexibility of the diaphragm (which can change shape to keep the trapped volume constant but allows movement of the stem). In certain conditions where the stability of the valve remains affected, compressibility of the control volume may be provided by an additional reservoir.

A control system for a gas distribution system is disclosed in U.S. Pat. No. 5,047,965 (Zlokovitz).

Adjustment of a gas regulator valve having a spring based diaphragm control pilot valve is effected by supplying or augmenting pressure to the spring side of the diaphragm from a supply of pressurized gas via an electrically adjustable regulator valve under the control of a local microprocessor. This apparatus could not be used with a water pressure control system as water is incompressible and therefore could not be used in one of the chambers of the spring based diaphragm controlled pilot valve.

SUMMARY OF THE INVENTION

The present invention aims to provide a control apparatus and method which mitigates some of the above problems.

Accordingly, in a first aspect the present invention provides control apparatus for controlling the pressure of a water distribution system, the apparatus including:
variable gas pressure output means for connection to a suitable control means of the water distribution system, and
a relatively high gas pressure source and a relatively low gas pressure source, each being selectively connectable to the variable gas pressure output means in order to vary the pressure of the variable gas pressure output means.

In this way, a low power control apparatus may be provided without using solenoid valves to control the variable pressure output means.

Preferably the apparatus includes at least one, and most preferably two, piezo valves. Such valves are disclosed in the following patents: U.S. Pat. No. 4,567,394 (EP0191011), U.S. Pat. No. 4,625,139 (EP0191011), EPO565510, U.S. Pat. No. 5,318,271 (EP0547022) and U.S. Pat. No. 5,343,894 (EP0538236), the disclosures of which are incorporated herein by reference.

The principle of a piezo valve is that an element of piezo electric material is moveable on application of a voltage. The movement of the element is used to open/close a small valve orifice. The advantage of this type of valve for this application is that because of the capacitor-like operation of the valve it consumes very little power—a typical power consumption of a piezo valve is a few micro watts whereas a typical power consumption of a solenoid valve is around 1 watt. Typically, the movement of the element is relatively small and so a piezo valve usually has only a small orifice and is therefore suitable for gas as a medium. For this reason, the invention is particularly suitable for use with a pilot valve in which the change in control pressure can be "amplified" to produce a larger change in the pressure of the valve being controlled—see for example, the dual chamber pilot valve described below with reference to FIG. 9.

As an alternative to using one or more piezo valves, the present invention may instead employ any alternative type of valve which operates at a suitably low power. In this context, low power operation preferably means a power consumption of less than one milii watt, more preferably less than 100 micro watts and most preferably less than 10 micro watts.

Preferably one piezo electric effect valve connects the relatively high gas pressure source to the variable gas pressure output means and a second piezo electric effect valve connects the relatively low gas pressure source to the variable gas pressure output means. By suitable operation of the two piezo valves (e.g. using a controller such as a microprocessor) the pressure of the variable gas pressure output means may be altered. As the piezo valves are effectively "zero power", this provides a very low power way to control the pressure of the water distribution system.

Preferably, the relatively low gas pressure source is atmospheric pressure i.e. the second piezo valve is simply connected between a pipe connected to the atmosphere and the variable gas pressure output means (e.g. an outlet pipe).

Preferably the relatively high gas pressure source is a gas reservoir and the gas may be air. In one embodiment, the pressure in the reservoir is controlled by feeding air into the reservoir from an air pump or other air pressure means via a check valve or other control means. The pressure in the reservoir is preferably monitored using a pressure sensor such as a pressure transducer and, upon receipt of a suitable signal from the pressure sensor, the controller operates the air pump to "top up" the pressure in the reservoir. In this way, the pump need only be operated sporadically and assuming negligible leakage in any pipework between the pump and the first (inlet) piezo valve, the pressure in the reservoir remains substantially constant until air usage takes place by operation of the piezo valve. This also helps provide a low power control apparatus.

By comparison with the pressure control apparatus described in EP 574241, a low power operation is achieved by reducing the power needed to control the valves by replacing the solenoid valves with piezo valves and only energizing the pump where a supply has been utilized for control. Effectively the burden of power consumption is transferred from the solenoid valve operation to the pump operation.

Preferably the first (inlet) piezo valve is of the type which is normally closed when unpowered and the second (outlet) piezo valve is of the type which is normally open when unpowered. This arrangement means that, in the absence of power, the pressure of the variable pressure output means is maintained at atmospheric pressure. Since the pressure of the reservoir may be selected by suitable operation of the pump or other pressure generation means, the variable outlet pressure may be suitably controlled. This, together with operation of the piezo valves, permits full control of the pressure of the water supply system and permits, for example, time dependent control of the pressure as taught in EP 574241.

In a further preferred embodiment, two more piezo valves are provided, one in conjunction with the inlet valve and one in conjunction with the outlet valve, thereby providing two inlet valves and two outlet valves. Depending on the required configuration of operation, the two inlet valves may be in parallel or in series and the two outlet valves likewise. In the embodiment described above where the inlet valves are normally closed when unpowered and the outlet valves are normally open when unpowered, the two inlet valves will be arranged in series with each other and the two outlet valves will be arranged in parallel with each other.

In a further preferred embodiment, the apparatus includes means for limiting the maximum pressure in the reservoir. For example, this can be done by use of a suitable controller e.g. by the software of a microprocessor controller being suitably programmed. Alternatively, this could be done by incorporation by a pressure relief valve or a pressure regulator in conjunction with the reservoir. Limiting the maximum reservoir pressure in this way in turn limits the minimum pressure of the water distribution system. This is desirable as, in the event of a fault, it is advantageous that the pressure of the water distribution system does not fall below a minimum value.

Preferably, the apparatus includes power control means which are operable to supply to power to the piezo valve(s). Preferably the power control means are arranged such that in the event of the controller not operating, the power control means do not supply power to the piezo valve. With the arrangement of piezo valves described above, this would ensure that in the event of a "crash" of the controller, the water supply system will revert to a safe operating pressure. For similar reason, the absence of power (e.g. a flat battery) will produce the same effect i.e. the water pressure system will revert to a safe operating pressure.

Conventionally, a piezo valve requires a relatively high voltage to operate (e.g. 24 volts). It is desired that the control apparatus of the present invention can be powered by, for example, a relatively low voltage e.g. 3.6 volts provided by e.g. a single lithium cell. The control apparatus may therefore include a DC-DC converter means in order to convert the voltage provided by the battery to a suitable voltage to operate the valves. The converter means may be driven by a timing signal provided by the controller and the controller is preferably arranged such that the timing signal will not be generated if the controller crashes. Hence, in this event, the valves will not be energized in the event of a crash and the system will revert to a safe pressure as in the case of loss of power.

Preferably the control means of the water distribution system to which the control apparatus is connectable is a main pressure control valve, such as a pressure reducing valve (PRV). As is conventional, this main valve may be under the control of a pipe valve, such as a dual diaphragm (sometimes known as a dual chamber) pilot valve as taught by EP 574241. In essence, the difference between a dual diaphragm pipe valve and a "normal" single diaphragm pilot valve is that the dual diaphragm pilot valve incorporates an additional control pressure chamber. By varying the pressure in this control pressure chamber, the output pressure of the pilot valve (and hence the outlet pressure of the main valve which it is controlling) may be varied.

FIG. 8 shows an example of a system utilizing a "sandwich plate" dual chamber pilot 20 as disclosed in European Patent No. 574241. The flow of water through the control chamber 5 is controlled by a gate mechanism 8 which is linked to a diaphragm 9. A spring 10 applies force to the rear of the diaphragm 9 and the amount of force supplied by the spring may be varied by an adjustment screw 11.

In a steady state situation (where the outlet pressure Po remains constant) the water pressure in the control chamber 5 will be balanced by the force generated the spring and the gate 8 will remain in a constant position. Thus the flow through the auxiliary pipe 4 will remain constant and the pressure (Pv) to the main valve will remain constant.

If the outlet pressure (Po) to be controlled falls (e.g. through increased demand), the spring 10 causes the gate 8 to open further and the flow through the auxiliary pipe increases. Accordingly, the flow through the venturi 6 also increases which results in pressure Pv decreasing, causing the main valve (PRV) to open further. This results in the control pressure Po rising again and the system should then reach a steady state again at the previously set value of Po.

The pilot valve 20 includes a second chamber 21 which is effectively divided into two portions 22 and 23 by a wall 24. A control pressure Pc effectively acts against the force of spring 10 by virtue of diaphragm 26. The spring is mechanically connected by arm 28 to a gate mechanism 8 which controls the flow through chamber 5. The arm 28 passes through wall 24 and the aperture through which it passes is sealed by a seal 29 so that chamber 23 does not contain any water but instead is vented to atmosphere.

If the control pressure Pc is reduced then the gate 8 will open further thereby reducing pressure Pv and increasing the outlet pressure Po. This is usually referred to as a "failsafe" system since in the event that the control pressure fails i.e. falls to zero, the outlet pressure Po will be set to its maximum value (determined by e.g. the main valve PRV).

Other prior art forms of dual diaphragm pilot valves are known.

In a further preferred embodiment, the dual diaphragm pilot valve is of the type described with reference to FIG. 9 and in the applicant's co-pending U.S. patent application Ser. No. 09/980,431 (unpublished application GB 9913058.5), the disclosure of which is incorporated herein by reference.

Preferably the pilot valve includes
  biasing means to control a gate for controlling fluid flow
    through a control chamber.

a second chamber sealed by a second chamber diaphragm into which control pressure is applicable for also controlling the operation of the gate, whereby in use an increase in control pressure acts to reduce fluid flow through the gate;

wherein the side of the diaphragm against which the control pressure is not applied is in fluid communication with the control chamber.

In this way, a "reverse acting" dual chamber pilot valve is provided in which the need for any seal in association with the second chamber is avoided.

Preferably, the biasing means is a spring means, e.g. a spring such as a helical spring. Preferably the biasing means is biased so as to open the gate and may be rigidly connected to the gate by a suitable mechanical linkage. Preferably the diaphragm is also rigidly connected to the gate and/or spring via the same or a second suitable mechanical linkage.

Preferably, the control chamber is at least partly or wholly bounded by a control chamber diaphragm in addition to the second chamber diaphragm. Preferably biassing means is located on the opposite side of the control chamber diaphragm to the control chamber. As will be explained in detail later in the specification, by approximately selecting the operational areas of the second chamber diaphragm and the control chamber diaphragm (e.g. those parts of the diaphragm which may move), the effect of the control pressure on the fluid flow through the control chamber (and therefore in use, on the outlet pressure) can be selected.

In a preferred embodiment, the ratio of the area of the control chamber diaphragm to the second chamber diaphragm is 2:1 or less. For example, if the control chamber diaphragm is twice the area of the second chamber diaphragm then a particular drop in control pressure will result in an identical increase in outlet pressure. In a different example, if the area of the second chamber diaphragm is three-quarters that of the control chamber diaphragm then an increase in control pressure of a given amount would cause the outlet pressure to decrease by three times that amount. The particular case in which the second chamber diaphragm area is half that of the control chamber diaphragm effectively replicates the function of the "sandwich" arrangement described earlier with reference to FIG. 8.

In a further aspect, the present invention provides a method for controlling the pressure of a water distribution system including controlling the pressure of a variable gas pressure output means of a control apparatus, the variable gas pressure output means being connected to a suitable control means of the water distribution system. The method includes the step of selectively connecting a relatively high gas pressure source and a relatively low gas pressure source to the variable gas pressure output means in order to vary its output pressure.

Other preferred features of the method are as explained above with reference to the apparatus of the present invention.

In addition to being used with a water distribution system, the present invention may also be used with a gas or other fluid distribution system.

BRIEF DESCRIPTION OF THE DRAWINGS

Embodiments will now be described with reference to the accompanying drawings in which.

BRIEF DESCRIPTION OF THE PREFERRED EMBODIMENTS

Figure 1:
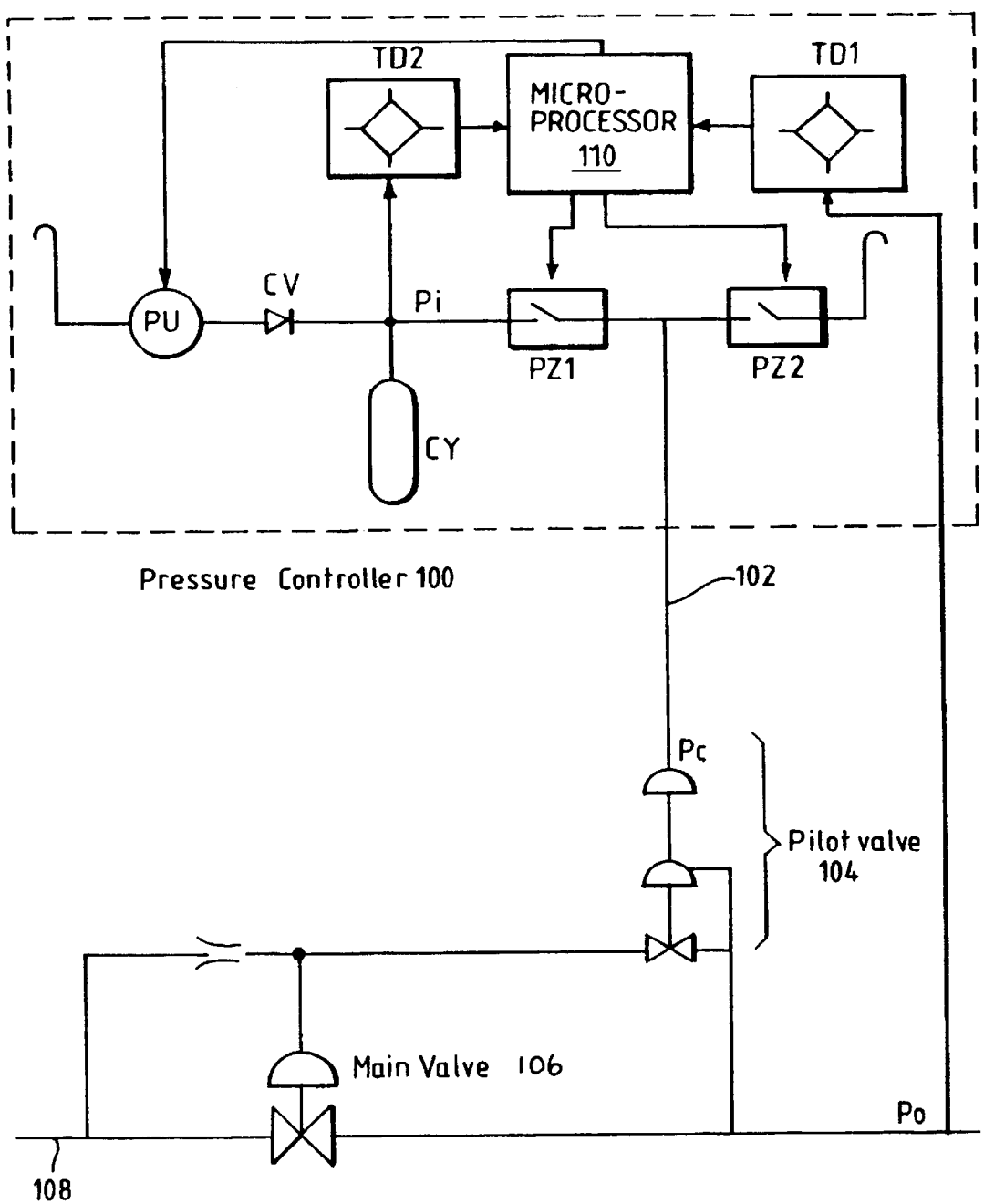
FIG. 1 is a schematic diagram showing an embodiment of a control apparatus according to the present invention in conjunction with part of a water distribution system.

FIG. 1 shows a control apparatus (pressure controller) 100 according to an embodiment of the present invention. The variable pressure output means (pipe 102) of the pressure controller 100 is connected to a pilot valve 104 which may be a dual diaphragm pilot valve, for example of the type shown in FIG. 8 or 9. The variable pressure output pipe 102 provides a control pressure $P_c$ to the pilot valve 104. The pilot valve 104 controls the outlet pressure $P_o$ of a main valve 106 of a pipe 108 of a water distribution system.

The control pressure Pc is controlled by the operation of two piezo valves PZ1 and PZ2 under the control of a microprocessor 110. Valve PZ2 is vented to atmospheric pressure and valve PZ1 is connected to a relatively high pressure source e.g. air reservoir CY. Air reservoir CY provides an inlet pressure $P_i$ to valve PZ1. The pressure $P_i$ of reservoir CY is controlled by a pump PU (also controlled by the microprocessor 110) which is selectively operated to top up reservoir CY via a check valve CV.

The microprocessor 110 receives pressure information from two transducers TD1 and TD2. TD1 monitors the outlet pressure Po of the main valve 106 and transducer TD2 monitors the inlet pressure $P_i$ of the reservoir CY. Based on this information, microprocessor 110 controls pump PU and valve PZ1 and PZ2 to control pilot valve 104 as required e.g. in accordance with predetermined time or pressure profile management requirements as taught in EP 574241. In this embodiment operation of PZ1 will increase Pc whereas operation of PZ2 will decrease Pc.

Figure 2:
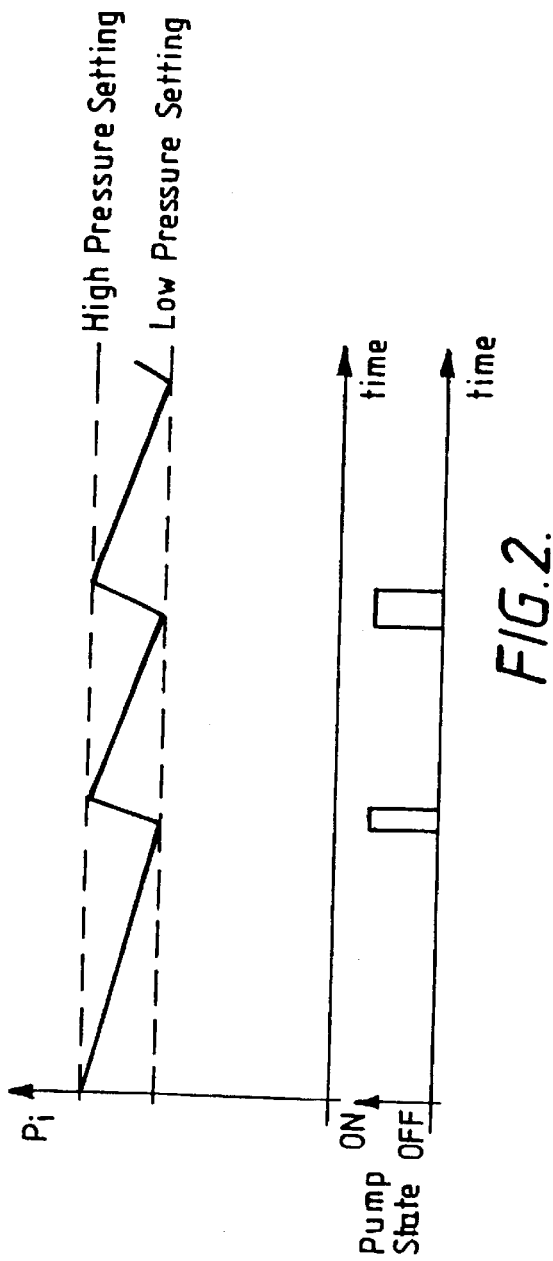
FIG. 2 is a graph showing an embodiment of the operation of the pump of FIG. 1.

In use, the microprocessor 110 turns on the pump PU when the reservoir CY pressure falls below a certain low pressure setting and turns off the pump PU when the pressure in reservoir in CY exceeds a certain high pressure setting. The cycle of control of pump PU is typically as shown in FIG. 2 which shows that sporadic operation of the pump PU maintains the pressure $P_i$ in the desired range. Assuming negligible leakage in the pipework between pump PU and inlet valve PZ1, the pressure in the cylinder CY remains constant until air usage takes place by operation of the piezo valves.

Figure 3:
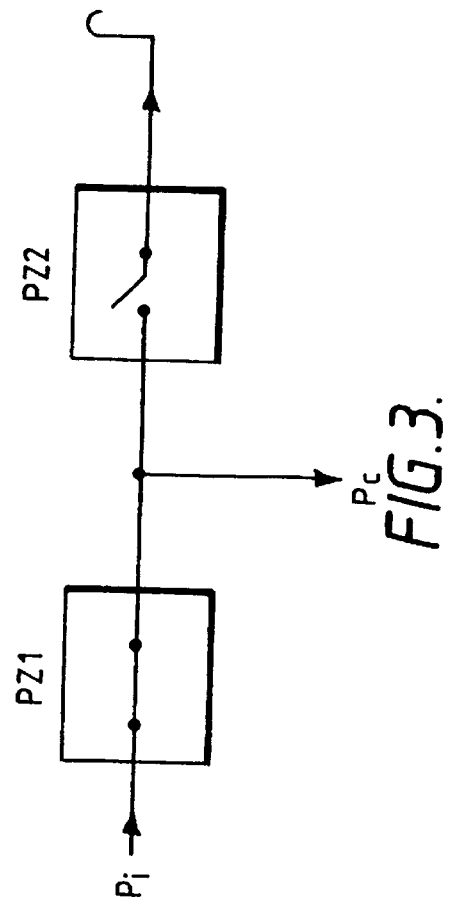
FIG. 3 shows in more detail the two piezo valves of FIG. 1.

Preferably the piezo valves are arranged as shown in FIG. 3, namely that PZ1 is of the type which is normally closed (i.e. no gas may flow when unpowered and PZ2 is of the type that is normally open (i.e. gas may flow) when unpowered, for the reasons explained previously.

Figure 4:
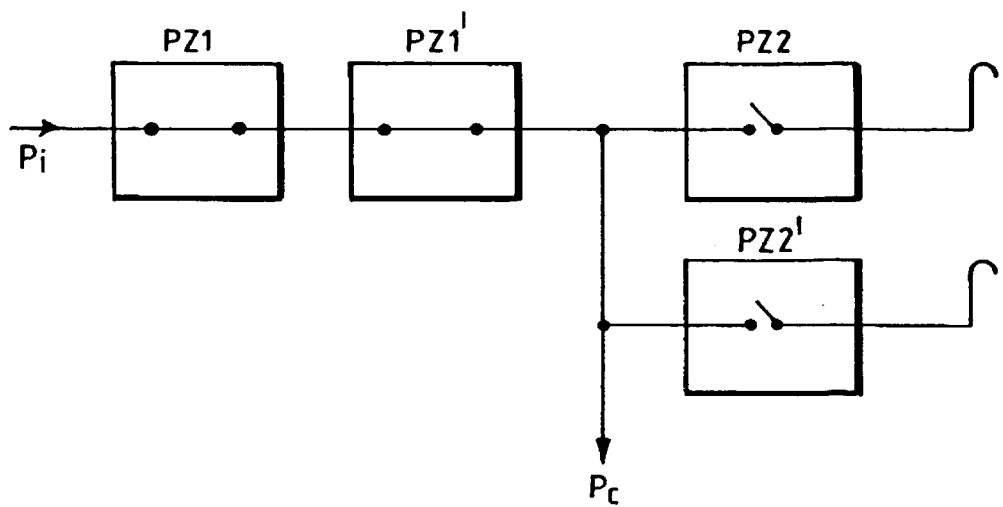
FIG. 4 shows a further embodiment of an arrangement of piezo valves for use in the control apparatus of FIG. 1.

For increased safety, the number of piezo valves may be doubled as shown in FIG. 4 i.e. effectively introducing a redundancy into one or both of the piezo valve circuits as required. For the same operation as shown in FIG. 3, the two inlet valves PZ1 and PZ1' are arranged in series and are closed when unpowered. Thus failure to close by one valve does not impair the safety of the system. Similarly the two outlet valves PZ2 and PZ2' are arranged in parallel and are normally open when unpowered. Again, failure to open by one valve does not impair the safety of the system.

Figure 5:
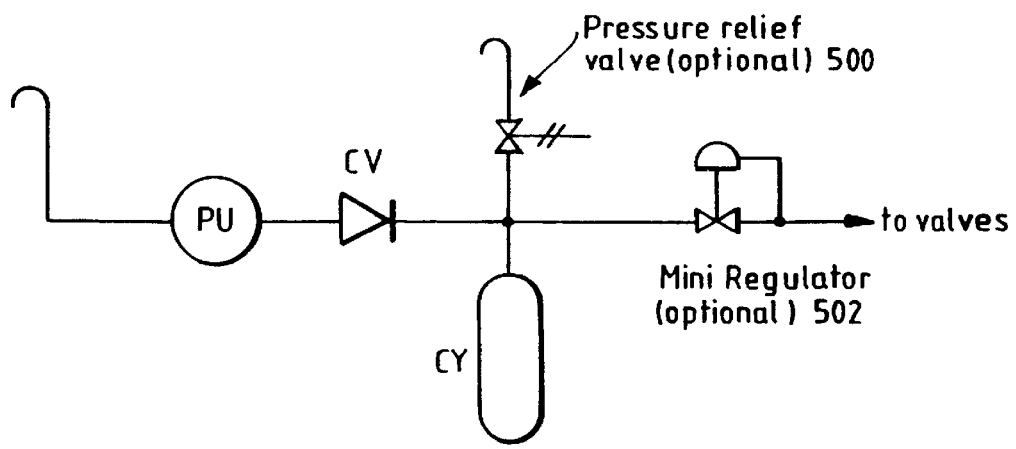
FIG. 5 shows a possible modification of the control apparatus of FIG. 1.

FIG. 5 shows a further safety feature, namely the incorporation of a pressure relief valve 500 and/or a regulator 502 in conjunction with the reservoir CY in order to limit the maximum pressure in the reservoir CY. If a pressure relief valve 500 is used it effectively vents reservoir CY to atmosphere when the pressure in reservoir CY becomes too large. If a regulator 502 is used this is placed in the pipeline which connects the reservoir CY to the valve PZ1. Additionally or alternatively, the pressure in CY could be limited by suitable control of microprocessor 110.

For a given maximum control pressure in the reservoir of $Pc_{max}$, using the dual diaphragm pilot valve of FIG. 9 the minimum outlet pressure $PO_{min}$ achievable will be as follows:

Spring force $(SF)=(A-A')PO_{min}+A'Pc_{max}$

Figure 6:
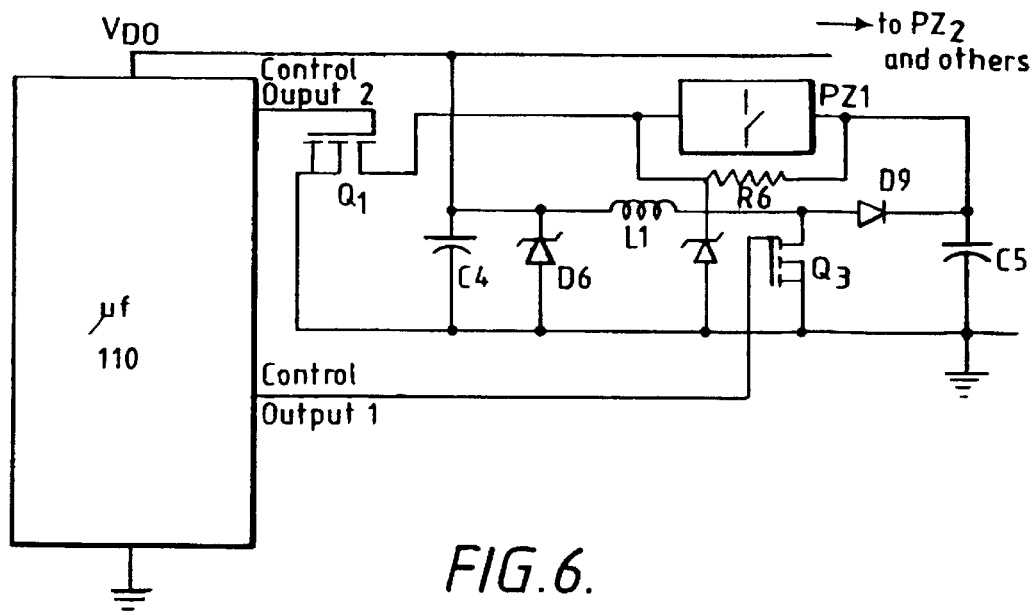
FIG. 6 is an embodiment of a power control circuit for use with the control apparatus of FIG. 1.

FIG. 6 shows one embodiment of a DC-DC converter for powering (in this example) one of the piezo valves PZ1 from a battery which provides a terminal voltage of VD0. A battery may be for example a single lithium cell (not shown) with a terminal voltage of 3.6.volts. Typically a piezo valve requires a voltage of around 24 volts in order to operate.

Figure 7:
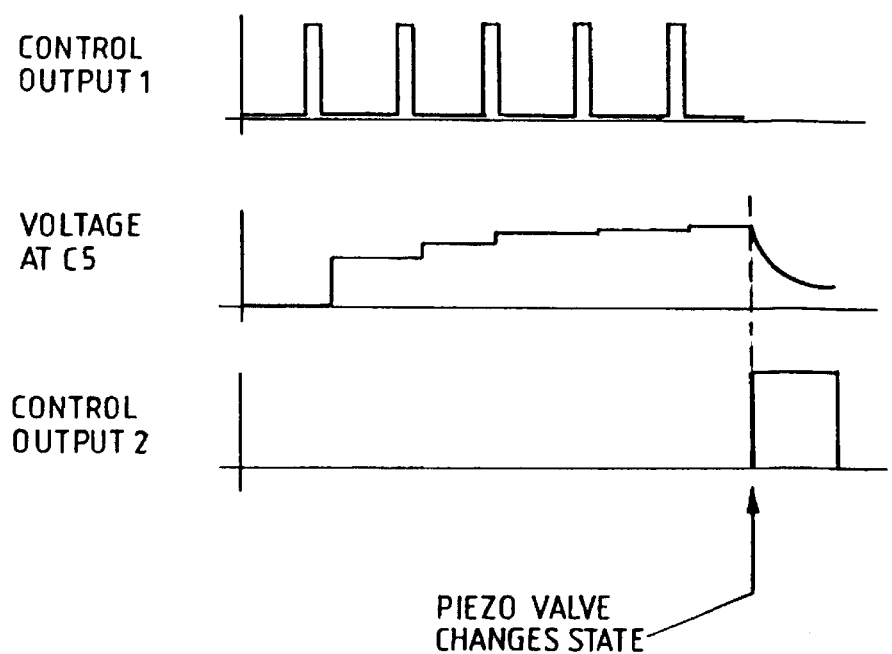
FIG. 7 is three graphs showing the operation of the apparatus of FIG. 6.

FIG. 7 shows three graphs indicating the operation of the circuit of FIG. 6 which is as follows.

When the microprocessor 110 needs to operate the piezo valve PZ1, firstly control output 2 is operated in order to open switch Q1. Control output 1 is then operated to close switch Q3 several times for several microseconds. When Q3 is closed, the current in inductor L1 rises rapidly causing the voltage across capacitor C5 to build up via diode D9.

After several pulses of switch Q3, the voltage across capacitor C5 will rise to the required value, usually between 20 and 24 volts. Control output 2 is then operated to close switch Q1 which in turn operates valve PZ1. Once control output 2 reoperates switch Q1, valve PZ1 will be turned off and resistor R6 ensures self-discharge across valve PZ1 to return PZ1 to its idle state.

The timing signal for the circuit which drives the switching cycle of the converter is generated by a linear section of code within the microprocessor 110. This code will not be executed if the microprocessor 110 crashes and so in such an event the valve PZ1 (and other valves connected to the same or similar circuits) will not be energized and the system will revert to a safe pressure as also happens in the case of a loss of power.

Figure 8:
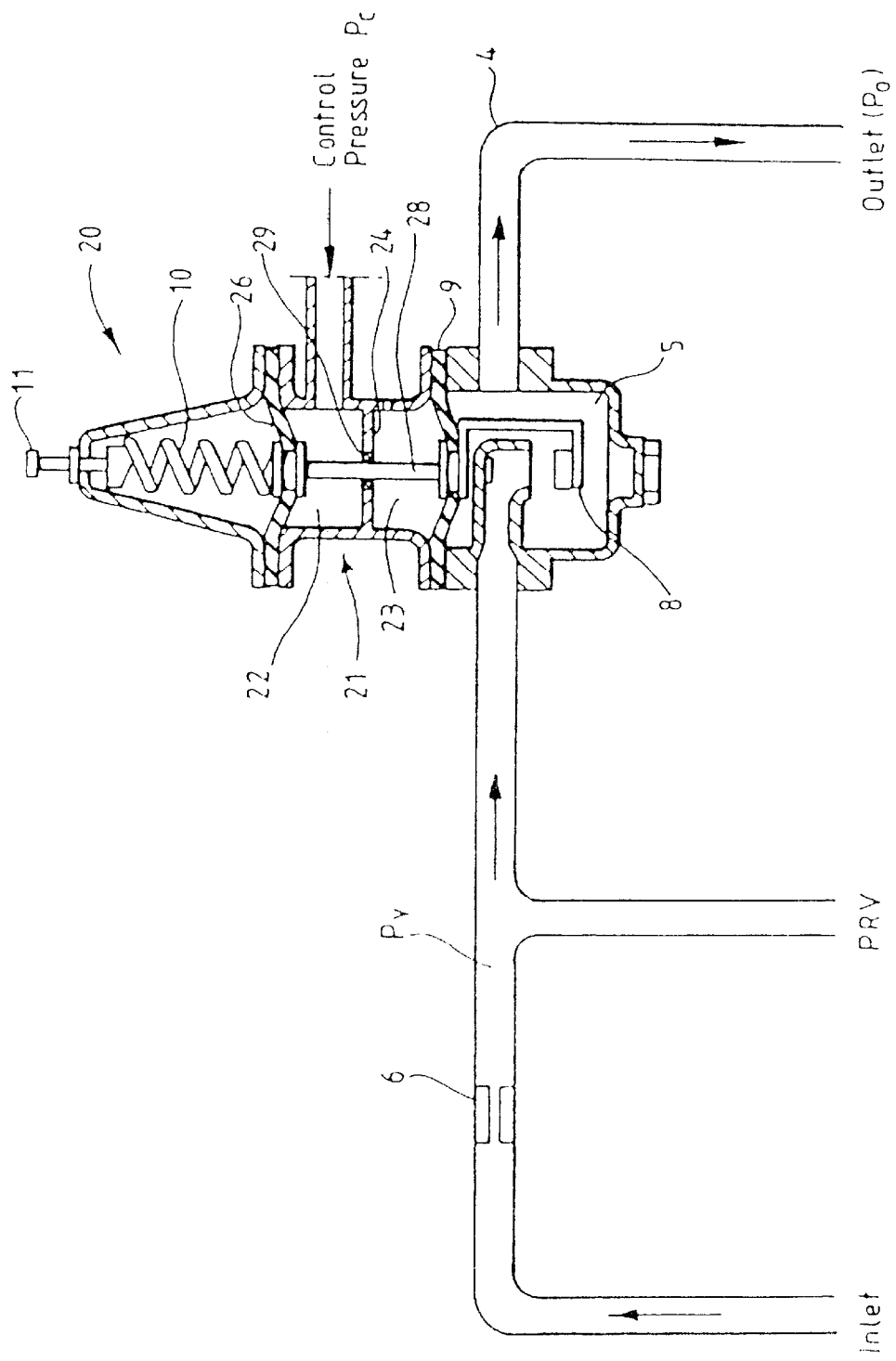
FIG. 8 is a schematic diagram of a prior art "sandwich" dual diaphragm pilot valve arrangement.

FIG. 8 is a schematic diagram of a prior art dual diaphragm pilot valve as disclosed in EP 574241 and described above.

Figure 9:
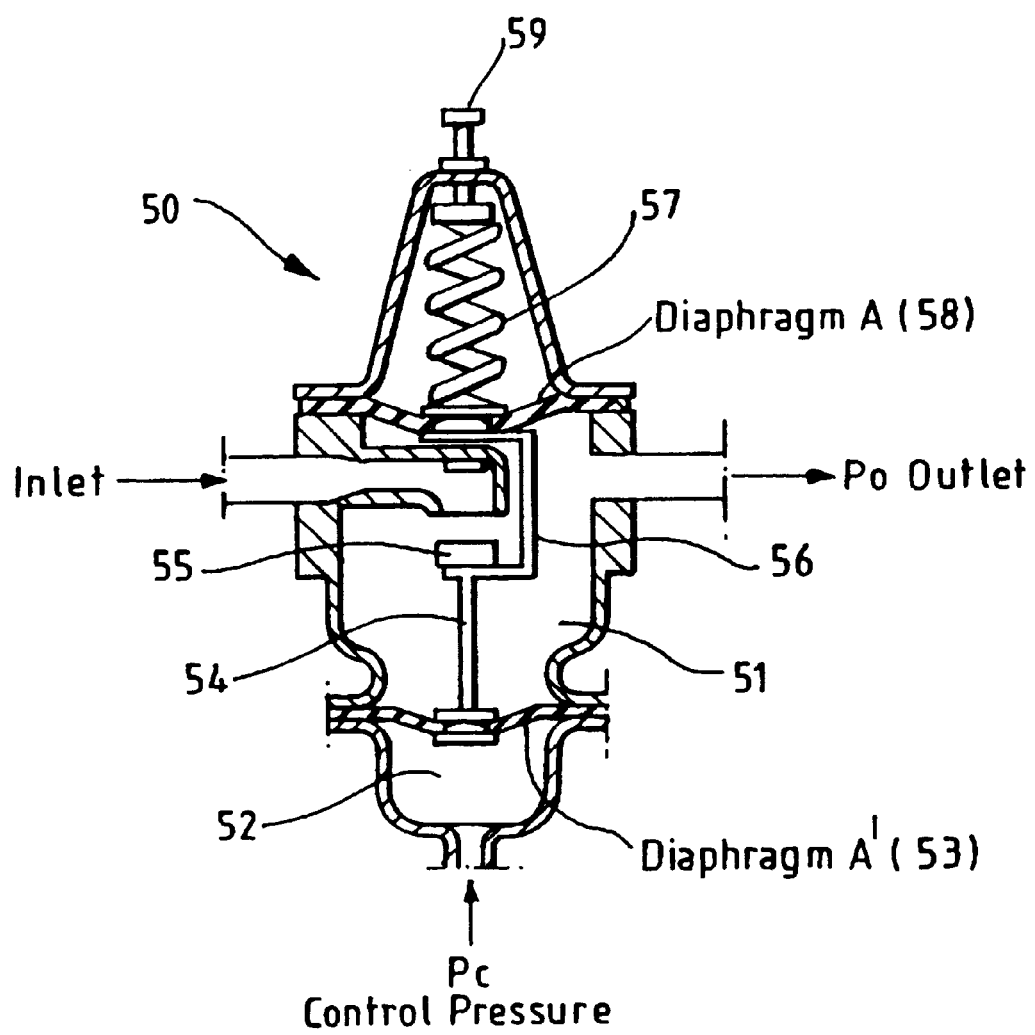
FIG. 9 is an embodiment of a dual diaphragm pilot valve according to an aspect of the present invention.

FIG. 9 illustrates a dual diaphragm pilot valve which may be used according to an aspect of the present invention.

The pilot valve 50 which includes a control chamber 51 and a second chamber 52. A control pressure Pc is applied to chamber 52 in use and chamber 52 is divided from control chamber 51 by a second chamber diaphragm 53.

The second chamber diaphragm 53 is rigidly connected via linkage 54 to a gate mechanism 55. The gate mechanism 55 is also connected via a further rigid linkage 56 to a spring 57. The spring 57 is isolated from the control chamber 51 by the control chamber diaphragm 58. The action of the force (SF) of the spring 57 on the diaphragm 58 may be adjusted by adjustment screw 59.

This type of dual diaphragm pilot valve is less likely to leak than the prior art "pancake" or "sandwich" pilot valves. As any leakage would increase the power consumption, this type of pilot valve is particularly useful in maintaining a low power consumption device.

As can be seen from FIG. 9, the control fluid (which may be gas e.g. air) present in the control chamber 51 acts against the opposite side of the second chamber diaphragm 53 to the control pressure Pc. In operation, if, for example, control pressure Pc is reduced then the gate 55 will open further causing the fluid flow through the control chamber to increase. When used in a PRV control circuit, as explained previously, this will cause the outlet pressure to increase.

As indicated in FIG. 9, the area of the control chamber diaphragm 58 is designated A and the area of the second chamber diaphragm 53 is designated as A'. The balance of forces operating in the pilot valve is as follows:

Spring force $(SF)=APo-A'Po+A'Pc$ $=(A-A')Po+A'Pc$

In a first example, if $A'=1/2A$ $SF=A'(Po+Pc)$

If a "multiplication" effect is required then the relative cross-section areas can be set to a different value. In a second example, if $A'=3/4 A$, the equation will be $SF=1/4A\ (Po+3PC)$ Therefore an increase of Pc of a given amount would cause Po to decrease by three times the amount and vice versa.

Due to the features of the pilot valve, the air pressure effect can be amplified. A low power miniature diaphragm pump can be used to generate, e.g. 0.5 bar. Using a pilot valve having diaphragms with 6/5 ratio, the relationship between control and outlet pressure is:

$$\text{Spring force } (SF) = \frac{6A}{5}Po - \frac{5A}{5}Po + \frac{5A}{5}Pc$$

$$\text{Spring force } (SF) = \frac{1A}{5}(Po + 5Pc)$$

Hence, a maximum control pressure of 0.5 bar will generate a reduction in Po of 2.5 bar which is sufficient in most cases to modulate the outlet pressure of the valve.

The above embodiment is given by way of example only and variations will be apparent to those skilled in the art.

What is claimed is:

1. A low power control apparatus for connection to a pilot valve for controlling the outlet pressure of a main pressure control valve of a water distribution system, said apparatus comprising:

a variable gas pressure output means for connection to the pilot valve;

a high gas pressure source and a low gas pressure source, each being selectively connectable to the variable gas pressure output means in order to vary the pressure of the variable gas pressure output means; and wherein either or both of the gas pressure sources are connected to the pressure output means by at least one piezo valve having a power consumption of less than one milli watt so that the control apparatus can be powered by a battery.

2. A control apparatus according to claim 1 wherein a first piezo electric effect valve connects said high gas pressure source to said variable gas pressure output means and a second piezo electric effect valve connects said low gas pressure source to said variable gas pressure output means.

3. A control apparatus according to claim 1 wherein said low gas pressure source is atmospheric pressure.

4. A control apparatus according to claim 1 wherein said high gas pressure source is a pressurized gas reservoir.

5. A control apparatus according to claim 4, including pressure means for controlling the pressure in the reservoir by feeding gas into the reservoir from the pressure means.

6. A control apparatus according to claim 5 including a pressure source wherein the pressure in the reservoir is preferably monitored using a pressure sensor and, upon receipt of a suitable signal from the pressure sensor, said pressure means is operable.

7. A control apparatus according to claim 2, wherein said first piezo valve is of a type of which is normally closed when unpowered and said second piezo valve is of a type which is normally open when unpowered.

8. A control apparatus according to claim 7 including a third and fourth piezo valve, the third valve being arranged in series with said first piezo valve and the fourth valve being arranged in parallel with said second piezo valve.

9. A control apparatus according to claim 4 including means for limiting the maximum pressure in said pressurized gas reservoir.

10. A control apparatus according to claim 1 including power control means which are operable to supply power to said at least one piezo valve.

11. A control apparatus according to claim 10 wherein said power control means are arranged such that in the event that they are not controlled, said power control means do not supply power to said at least one piezo valve.

12. A control apparatus according to claim 1 including DC-DC converter means to convert the voltage provided by a battery to a suitable voltage to operate said at least one piezo valve.

13. A control apparatus according to claim 12 wherein the converter means is driven by a timing signal provided by a controller and the controller is arranged such that the timing signal will not be generated if the controller crashes.

14. A pressure control system including control apparatus according to above claim 1 connected to a main pressure control valve under the control of a pipe valve.

15. A pressure control system according to claim 14 wherein said pipe valve is a dual diaphragm pilot valve.

16. A pressure control system according to claim 15 wherein said pilot valve includes biasing means to control a gate for controlling fluid flow through a control chamber;
   a second chamber sealed by a second chamber diaphragm into which control pressure is applicable for also controlling the operation of the gate, whereby in use an increase in control pressure acts to reduce fluid flow through the gate; and
   wherein the side of the diaphragm against which the control pressure is not applied is in fluid communication with the control chamber.

17. Apparatus according to claim 1 wherein said apparatus is for use with a fluid distribution system.

18. A method for controlling the pressure of a water distribution system, said method comprising the steps of:
   controlling the pressure of a variable gas pressure output means of a low power control apparatus, the variable gas pressure output means being connected to a pilot valve connected to a main pressure control valve of the water distribution system;
   connecting a high gas pressure source and a low gas pressure source to the variable gas pressure output means in order to vary its output pressure; and
   connecting either or both of the gas pressure sources to the pressure output means by at least one piezo valve having a power consumption of less than one milli watt so that the control apparatus can be powered by a battery.

19. A low power control apparatus for connection to a pilot valve for controlling the outlet pressure of a main pressure control valve of a water distribution system, said apparatus comprising:
   variable gas pressure output means for connection to the pilot valve;
   a pressurized gas reservoir and an atmospheric pressure source, each being selectively connectable to the variable gas pressure output means in order to vary the pressure of the variable gas pressure output means;
   a first piezo electric effect valve connecting the pressurized gas reservoir to the variable gas pressure output means and a second piezo electric effect valve connects the atmospheric pressure source to the variable gas pressure output means;
   pressure means for controlling the pressure in the reservoir by feeding gas into the reservoir from the pressure means; and
   a pressure sensor wherein the pressure in the reservoir is preferably monitored using the pressure sensor, and upon receipt of a signal from the pressure sensor, the pressure means is operable, wherein the first piezo valve is of the type which is normally closed when unpowered and the second piezo valve is of the type which is normally open when unpowered;
   wherein said first and second piezo electric effect valves each have a power consumption of less than one milli watt so that the control apparatus can be powered by a battery.

20. A low power control apparatus for connection to a pilot valve for controlling the outlet pressure of a main pressure control valve of a water distribution system, said apparatus comprising:
   variable gas pressure output means for connection to the pilot valve;
   a pressurized gas reservoir and an atmospheric pressure source, each being selectively connectable to the variable gas pressure output means in order to vary the pressure of the variable gas pressure output means;
   a first piezo electric effect valve connecting the pressurized gas reservoir to the variable gas pressure output means and a second piezo electric effect valve connects the atmospheric pressure source to the variable gas pressure output means;
   pressure means for controlling the pressure in the reservoir by feeding gas into the reservoir from the pressure means;
   a pressure sensor wherein the pressure in the reservoir is preferably monitored using the pressure sensor, and upon receipt of a signal from the pressure sensor, the pressure means is operable;
   power control means which are operable to supply power to said first and second piezo electric effect valves, wherein said power control means are arranged such that in the event that they are not controlled, said power control means do not supply power to said first and second piezo electric effect valves, wherein the first piezo valve is of the type which is normally closed when unpowered and the second piezo valve is of the type which is normally open when unpowered; and DC-DC converter means to convert the voltage provided by a battery to a suitable voltage to operate said first and second piezo electric effect valves wherein the converter means is driven by a timing signal provided by a controller and the controller is arranged such that the timing signal will not be generated if the controller crashes;

wherein said first and second piezo electric effect valves each have a power consumption of less than one milli watt so that the control apparatus can be powered by a battery.

21. A low power control apparatus for connection to a pilot valve for controlling the outlet pressure of a main pressure control valve of a water distribution system, said apparatus comprising:

variable gas pressure output means for connection to the pilot valve;

a pressurized gas reservoir and an atmospheric pressure source, each being selectively connectable to the variable gas pressure output means in order to vary the pressure of the variable gas pressure output means;

a first piezo electric effect valve connecting the pressurized gas reservoir to the variable gas pressure output means and a second piezo electric effect valve connecting the atmospheric pressure source to the variable gas pressure output means;

a third and fourth piezo electric effect valve, the third valve being arranged in series with said first piezo electric effect valve and the fourth valve being arranged in parallel with said second piezo electric effect valve;

pressure means for controlling the pressure in the reservoir by feeding gas into the reservoir from the pressure means;

a pressure sensor wherein the pressure in the reservoir is monitored using the pressure sensor, and upon receipt of a signal from the pressure sensor, the pressure means is operable; and power control means which are operable to supply power to said first, second, third and fourth piezo electric effect valves, wherein said power control means are arranged such that in the event that they are not controlled, said power control means do not supply power to said first, second, third and fourth piezo electric effect valves, wherein the first and third piezo electric effect valves are of the type which is normally closed when unpowered and the second and fourth piezo electric effect valves are of the type which is normally open when unpowered;

wherein said first, second, third and fourth piezo electric effect valves each have a power consumption of less than one milli watt so that the control apparatus can be powered by a battery.

22. A low power control apparatus for connection to a pilot valve for controlling the outlet pressure of a main pressure control valve of a water distribution system, said apparatus comprising:

variable gas pressure output means for connection to the pilot valve;

a pressurized gas reservoir and an atmospheric pressure source, each being selectively connectable to the variable gas pressure output means in order to vary the pressure of the variable gas pressure output means;

a first piezo electric effect valve connecting the pressurized gas reservoir to the variable gas pressure output means and a second piezo electric effect valve connecting the atmospheric pressure source to the variable gas pressure output means;

a third and fourth piezo electric effect valve, the third valve being arranged in series with said first piezo electric effect valve and the fourth valve being arranged in parallel with said second piezo electric effect valve;

pressure means for controlling the pressure in the reservoir by feeding gas into the reservoir from the pressure means;

a pressure sensor wherein the pressure in the reservoir is monitored using the pressure sensor, and upon receipt of a signal from the pressure sensor, the pressure means is operable; and power control means which are operable to supply power to said first, second, third and fourth piezo electric effect valves, wherein said power control means are arranged such that in the event that they are not controlled, said power control means do not supply power to said first, second, third and fourth piezo electric effect valves, wherein the first and third piezo electric effect valves are of the type which is normally closed when unpowered and the second and fourth piezo electric effect valves are of the type which is normally open when unpowered;

a DC-DC converter means to convert the voltage provided by a battery to a suitable voltage to operate said piezo electric effect valves wherein the converter means is driven by a timing signal provided by a controller and the controller is arranged such that the timing signal will not be generated if the controller crashes;

wherein said first, second, third and fourth piezo electric effect valves each have a power consumption of less than one milli watt so that the control apparatus can be powered by a battery.

23. A low power control apparatus for connection to a pilot valve for controlling the outlet pressure of a main pressure control valve of a water distribution system, said apparatus comprising:

a variable gas pressure output means for connection to the pilot valve;

a high gas pressure source and a low gas pressure source, each being selectively connectable to the variable gas pressure output means in order to vary the pressure of the variable gas pressure output means; and wherein either or both of the gas pressure sources are connected to the pressure output means by at least one piezo valve having a power consumption of less than one milli watt, and the control apparatus includes a DC-DC converter means to convert the voltage provided by a battery to a suitable voltage to operate said at least one piezo valve, so that the control apparatus can be powered by a single lithium cell.

24. A pressure control system including a low power control apparatus connected to a main pressure control valve of a water distribution system, said main pressure control valve being under the control of a pilot valve for controlling the outlet pressure of said main pressure control valve, wherein said apparatus comprises:

a variable gas pressure output means for connection to the pilot valve;

a high gas pressure source and a low gas pressure source, each being selectively connectable to the variable gas pressure output means in order to vary the pressure of the variable gas pressure output means; and wherein either or both of the gas pressure sources are connected to the pressure output means by at least one piezo valve having a power consumption of less than one milli watt so that the control apparatus can be powered by a battery; and wherein said pilot valve is a dual diaphragm pilot valve, said pilot valve including biasing means to control a gate for controlling fluid through a control chamber; an outlet of the control chamber being connectable so that the water pressure in the chamber of the outlet is substantially equal to the outlet pressure of the main pressure control valve being controlled;

a second chamber sealed by a second chamber diaphragm into which control pressure is applicable for also controlling the operation of the gate; and the control pressure is different from the outlet pressure of the main pressure control valve being controlled;

wherein the side of the diaphragm against which the control pressure is not applied is in fluid communication with the control chamber.

* * * * *